(12) United States Patent
Uradnisheck

(10) Patent No.: US 8,110,138 B2
(45) Date of Patent: Feb. 7, 2012

(54) POLY(HYDROXYALKANOIC ACID) AND THERMOFORMED ARTICLES

(75) Inventor: Julius Uradnisheck, Glen Mills, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 183 days.

(21) Appl. No.: 12/436,310

(22) Filed: May 6, 2009

(65) Prior Publication Data

US 2009/0278279 A1    Nov. 12, 2009

Related U.S. Application Data

(60) Provisional application No. 61/051,541, filed on May 8, 2008.

(51) Int. Cl.
     *B29C 51/00*      (2006.01)
(52) U.S. Cl. .................. 264/544; 264/210.1; 264/320
(58) Field of Classification Search .................. 264/544, 264/210.1, 320
See application file for complete search history.

(56) References Cited

U.S. PATENT DOCUMENTS

| | | | |
|---|---|---|---|
| 5,443,780 A | 8/1995 | Matsumoto | |
| 6,114,495 A | 9/2000 | Kolstad | |
| 6,323,308 B1 | 11/2001 | Kobayashi | |
| 6,417,294 B1 | 7/2002 | Obuchi | |
| 6,803,443 B1 | 10/2004 | Ariga | |
| 6,943,214 B2 | 9/2005 | Flexman | |
| 6,960,374 B1 | 11/2005 | Tarada | |
| 7,175,917 B2 | 2/2007 | Sukigara | |
| 7,301,000 B2 | 11/2007 | Satkowski | |
| 2004/0242803 A1 | 12/2004 | Ohme | |
| 2005/0098928 A1 | 5/2005 | Rosenbaum et al. | |
| 2005/0131120 A1 | 6/2005 | Flexman | |
| 2008/0033077 A1 * | 2/2008 | Hashimoto et al. | 524/9 |
| 2009/0099313 A1 | 4/2009 | Uradnisheck | |

FOREIGN PATENT DOCUMENTS

| | | |
|---|---|---|
| EP | 1887044 A1 | 2/2008 |
| JP | H06-160314 A1 | 1/1996 |
| JP | H09-316310 A1 | 9/1997 |
| JP | H09-286909 A1 | 11/1997 |
| JP | H11-240962 A1 | 9/1999 |
| JP | 2002-146170 A1 | 5/2002 |
| JP | 2006348060 A | 12/2006 |
| JP | 2007-145937 A1 | 6/2007 |
| WO | 0023520 A1 | 4/2000 |
| WO | 03014224 A2 | 8/2002 |
| WO | 02/072335 A1 | 9/2002 |
| WO | 03082980 A1 | 10/2003 |
| WO | 2004101642 A1 | 11/2004 |
| WO | WO 2005/059031 A1 * | 6/2005 |
| WO | 2009/048797 A1 | 4/2009 |

* cited by examiner

*Primary Examiner* — Joseph Del Sole
*Assistant Examiner* — James Sanders
(74) *Attorney, Agent, or Firm* — Lucas K. Shay

(57) ABSTRACT

Disclosed is a process comprising extruding a poly(hydroxyalkanoic acid) (PHA) to produce a first article; thermoforming the first article in a heated mold having a temperature ≧ about 90° C. to produce a second article; and heat treating the second article by holding the second article in the heated mold for less than about 40 seconds to produce a thermoformed article wherein the PHA composition comprises or consists essentially of PHA and 0 to about 4%, based on the weight of the composition, of a nucleator; and the first article is a film or sheet and is partially crystallized.

20 Claims, No Drawings

POLY(HYDROXYALKANOIC ACID) AND THERMOFORMED ARTICLES

This application claims priority to U.S. provisional application Ser. No. 61/051,541, filed May 8, 2008, the entire disclosure of which is incorporated herein by reference.

The invention relates to a poly(hydroxyalkanoic acid) composition, to a process for improving temperature resistance while minimizing haze, and to an article comprising the composition.

BACKGROUND OF THE INVENTION

Poly(hydroxyalkanoic acid) (PHA) such as polylactic acid (PLA) is a resin comprising renewable monomer such as produced by bacterial fermentation of plant matter that include corn, sugar beets, or sweet potatoes. The resin can be used for transparent thermoformed packaging articles such as cups, trays, and clam shells. Generally, the resin is first extruded into an amorphous sheet, the sheet is then heated to above the glass transition temperature (Tg), and vacuum or pressure formed using an unheated mold into finished articles. The benefits of articles PHA are counter-balanced somewhat by dimensional instability of those articles at hot, ambient conditions.

Sections of the articles of low degrees of stretch such as less than about a 2.5-fold (250%) lengthening do not fully crystallize because many PLA grades crystallize too slowly in short cycle time thermoforming equipment or crystallize with less than 10% crystallinity in the given time. As PLA grades popular for thermoforming have a Tg of 55° C., articles of such PLA that are thermoformed into cool molds have poor dimensional stabilities when heated above the 55° C. Since packaging articles of PLA can experience temperatures slightly above 55° C. during transport or storage it is desirable to find ways to give PLA articles better mechanical stability under such conditions. A thermoformed or stretched article may shrink in a few seconds by more than 5% (sometimes 50%) when heated above the Tg. The tendency for shrinkage may be especially high (to 50%) in those parts of a molded article that experiences a critical amount of orientation between about 25% (final length or area is 25% greater than the pre-formed length or area) and about 100%. Those regions having higher than about 100% or about 250% orientation may experience some added crystallization during the forming process. Accordingly, they may have a lowered shrinkage tendency than other regions. Those areas having no orientation may have low shrinkages (<10%); however, these areas are soft and easily deform when mechanically stressed at temperatures slightly above Tg. Those regions in between about 100% and about 250% may have the highest shrinkage which is most benefited by the subject of this application. High forces can be generated by shrinkage and therefore the shrinkage of one region in a complex hollow article can be magnified into a larger dimensional effect on the overall structure. Therefore for the purpose of this application the desirable shrinkage is less than 8%, less than 4%, or less than 1%.

The shrinkage force can be due to the presence of stretched PLA molecules not crystallized but amorphous and frozen in place by the rapid cooling in the mold, termed "amorphous orientation". When the temperature rises above Tg these molecules relax in a few seconds and induce or cause shrinkage if the article is not constrained from shrinking (i.e. shrinkage-by-relaxation). Some additional shrinkage in a few minutes can arise from crystallization (i.e. shrinkage-by-crystallization) if the PLA is not crystallized fully to its capacity and the temperature of the article is considerably above the Tg and especially at the average temperature of the Tg and melting point. A particularly fast crystallizing PLA due to its low molecular weight (such as below 10,000 g/mole), low D-lactide (meso-lactide) content, and/or use of high amounts of special nucleators may enable shrinkage-by-crystallization to happen below the average of Tg and the melt point if the article is not crystallized to the capacity of the PLA. The benefit of this application is for low haze.

To solve the shrinkage or dimensional stability problems, one may increase crystallinity and/or decrease amorphous orientation. A numerical ratio therefore to be minimized is the amount of amorphous orientation versus total crystallinity. Such a ratio, which can be defined by x-ray, is the ratio of amorphous orientation determined by x-ray to total crystallinity determined by x-ray and preferably is less than about 2 or less than about 1 or more preferably less than about 0.1. Another indication of amorphous orientation might be via correlation between x-ray and an endotherm just above Tg determined by Differential Scanning Calorimetry (DSC) termed "enthalpy relaxation". Articles of PLA having amorphous orientation by x-ray may have about 9 J/g of an endotherm within 5° C. above Tg during 10° C./minute heating of samples. Samples without amorphous orientation have 0 J/g of this endotherm. Data suggests that it may not entirely focus on maximizing crystallinity for low shrinkage-by-relaxation, but may minimize the ratio of the endotherm at Tg to total crystallinity to less than about 0.3, or 0.1 or 0.05. Minimizing the ratio of amorphous orientation to total crystallinity instead of maximizing total crystallinity may alleviate high levels of crystallinity which tend to introduce higher levels of haze in conventional thermoforming processes.

There may be methods for minimizing the ratio of amorphous orientation to total crystallinity. For example, to increase the crystallinity of a PHA or PLA having a Tg of 55° C. and a melt point of 155° C., one may heat-treat the finished molded article at 105° C. for several minutes to give the article hardness when heated above 55° C. However, doing so may cause the article to shrink in the first few seconds of the heat treatment.

One may heat-treat the article for several seconds at about 105° C. in a heated mold while it is constrained from shrinking in that mold. Doing so would leave as amorphous those regions of the article that have not been oriented more than about 25%. Removal of the article from the hot mold would cause deformation of those regions possibly due their sticking to the hot mold or their deformation under low mechanical stresses while still hot.

One may heat-treat the article for several minutes at about 105° C. while it is constrained from moving in the heated mold. The removal process would not deform the article since it is hardened by crystallinity. Doing so may extend the thermoforming cycle time to an inefficiently long time.

Alternatively, one may reduce the original amount of amorphous orientation, by molding an article at a high temperature, above the average of Tg and melt point. Excessively high temperatures, more than about 25° C. such as approaching the melt point, may give excessive sagging of the hot sheet or deformation at its supports before being thermoformed. Slightly lower excessive temperatures could be problematical due to exudation of oligomer or additives on the surface of the mold giving surface roughness to the molded article. Running at high temperatures (e.g., at about 25° C. above the average of Tg and melt point) may give a molded article having few stretched amorphous PLA molecules and reduced shrinkage compared with a molded article having stretched amorphous molecules. However, the article may be 90% or more amorphous, which may be soft and easily, undesirably deformable in its use above the Tg, while an article of >10% crystalline is generally desired for its being dimensionally stable above its Tg. A 90% amorphous article may also experience some shrinkage when held for weeks at temperatures above 55° C. due to some beginnings of crystallization or other molecular re-arrangement.

To increase the crystallinity, one may mold an article at high temperature and anneal the article in the molds at a temperature of the average of Tg and the melt point to increase the crystallinity but doing so may greatly increase the haziness of the article.

Alternatively an article can be made such that the resin is stretched during thermoforming to more than about 150% and heat treated for a few seconds at the average of Tg and melting point. Doing so may give clarity and dimensional stability due to strain-induced crystallization (that is, crystallization during the stretching process), but this large amount of stretching limits the shape of molded articles to those that are very long and narrow.

One may also increase the crystallinity or rate of crystallization by use of a nucleator for PLA. Nucleators include talc, calcium silicate, sodium benzoate, calcium titanate, boron nitride, copper phthalocyanine, and isotactic polypropylene. Using nucleator introduces high haze or opacity to the otherwise transparent PLA articles thereby impairing the value of the articles. See, e.g., U.S. Pat. No. 6,114,495, U.S. Pat. No. 6,417,294, and WO 03014224.

Therefore, there is a need to produce a low haze (i.e., contact clarity, which means substantially clear to read through by human eyes) article from PHA and to increase the dimensional stability throughout the surface of the low haze article. We have found that very hot molds may be used with PHA to generate 0% shrinkage-by-relaxation above Tg, that nucleators allow the use of such hot molds and that crystallizing PHA to their maximum capacity is not necessary for such dimensional stability.

SUMMARY OF THE INVENTION

A process comprises extruding a poly(hydroxyalkanoic acid) (PHA) to produce a first article; thermoforming the first article in a heated mold having a temperature ≧ about 90° C. to produce a second article; and heat treating the second article by holding the second article in the heated mold for less than about 40 seconds to produce a thermoformed article wherein the PHA composition comprises or consists essentially of PHA and 0 to about 4%, based on the weight of the composition, of a nucleator; and the first article is a film or sheet and is partially crystallized.

DETAILED DESCRIPTION OF THE INVENTION

"Partially crystallized" means an article having at least about 2%, or at least about 5%, up to about 20% crystallinity. "Amorphous" means a sample of PHA that, when heated in a Differential Scanning Calorimeter (DSC) from ambient to 25° C. above its melting point at about 10° C./minute, shows less than about 0.5 J/g when the melting endotherm "J/g" is subtracted by the heat-up crystallization exotherm "J/g". A fast crystallizing PHA is one that, when amorphous and is heated in the DSC, develops more than 5 J/g in the heat-up crystallization exotherm and especially more than 20 J/g. A slow crystallizing PHA is one that when amorphous and is heated in the DSC develops less than 5 J/g and especially less than 1 J/g of crystallization exotherm. A "crystallizable" PHA is one that when heated at a temperature that is the average of the Tg and melting point for 4 hours, more than 5 J/g of crystallinity is developed.

PHA compositions include polymers comprising repeat units derived from one or more hydroxyalkanoic acids having 2 to 15, 2 to 10, 2 to 7, or 2 to 5, carbon atoms. Examples include glycolic acid, lactic acid, 3-hydroxypropionate, 2-hydroxybutyrate, 3-hydroxybutyrate, 4-hydroxybutyrate, 3-hydroxyvalerate, 4-hydroxyvalerate, 5-hydroxyvalerate, 6-hydroxyhexanoic acid, 3-hydroxyhexanoic acid, 4-hydroxyhexanoic acid, 3-hydroxyheptanoic acid, or combinations of two or more thereof. Examples of polymers include poly(glycolic acid) (PGA), poly(lactic acid) (PLA) and poly(hydroxybutyrate) (PHB), polycaprolactone (PCL), or combinations of two or more thereof, including blends of two or more PHA polymers (e.g., blend of PHB and PCL) that are desirably crystallizable.

PHA can be produced by bulk polymerization. A PHA may be synthesized through the dehydration-polycondensation of the hydroxyalkanoic acid. A PHA may also be synthesized through the dealcoholization-polycondensation of an alkyl ester of polyglycolic acid or by ring-opening polymerization of a cyclic derivative such as the corresponding lactone or cyclic dimeric ester. The bulk polymerization can be carried out by two production processes, i.e., a continuous process and a batch process. JP03-502115A discloses a process wherein bulk polymerization for cyclic esters is carried out in a twin-screw extruder. JP07-26001A discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JP07-53684A discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. No. 2,668,162 and U.S. Pat. No. 3,297,033 disclose batch processes.

PHA also includes copolymers comprising more than one PHA, such as polyhydroxybutyrate-hydroxyvalerate (PHB/V) copolymers and copolymers of glycolic acid and lactic acid (PGA/LA). Copolymers can be produced by copolymerization of a polyhydroxyalkanoic acid or derivative with one or more cyclic esters and/or dimeric cyclic esters. Such comonomers include glycolide (1,4-dioxane-2,5-dione), dimeric cyclic ester of glycolic acid, lactide (3,6-dimethyl-1,4-dioxane-2,5-dione), α,α-dimethyl-β-propiolactone, cyclic ester of 2,2-dimethyl-3-hydroxypropanoic acid, β-butyrolactone, cyclic ester of 3-hydroxybutyric acid, δ-valerolactone, cyclic ester of 5-hydroxypentanoic acid, ε-caprolactone, cyclic ester of 6-hydroxyhexanoic acid, and lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., cyclic ester of 12-hydroxy-dodecanoic acid, and 2-p-dioxanone, cyclic ester of 2-(2-hydroxyethyl)-glycolic acid, or combinations of two or more thereof.

PHA compositions also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. About 100 different comonomers have been incorporated into PHA polymers. Generally, copolymers having the more moles of comonomer(s) incorporated, the less likely the resulting copolymer is to crystallize. If the copolymer does not crystallize when precipitated out of its soluble solution in some organic solvent, it cannot not crystallize when it is melt-blended with a nucleator.

PHA polymers and copolymers may also be made by living organisms or isolated from plant matter. Numerous microorganisms have the ability to accumulate intracellular reserves of PHA polymers. For example, copolymer poly(3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

Glycolic acid is derived from sugar cane. Poly(glycolic acid) can be synthesized by the ring-opening polymerization of glycolide and is sometimes referred to as poly-glycolide.

PLA includes poly(lactic acid) homopolymers and copolymers of lactic acid and other monomers containing at least 50 mole % (50% comonomer gives the least likely random copolymer composition to crystallize, no matter what heat treatment conditions) of repeat units derived from lactic acid or its derivatives (mixtures thereof) having a number average molecular weight of 3000 to 1000000, 10000 to 700000, or 20000 to 300000. PLA may contain at least 70 mole % of repeat units derived from (e.g. made by) lactic acid or its derivatives. The lactic acid monomer for PLA homopolymers and copolymers can be derived from d-lactic acid, l-lactic acid, or combinations thereof. A combination of two or more PLA polymers can be used. PLA may be produced by catalyzed ring-opening polymerization of the dimeric cyclic ester of lactic acid, which is frequently referred to as "lactide." As a result, PLA is also referred to as "polylactide".

PLA also includes the special class of copolymers and blends of different stereo-isomers of lactic acid or lactide. Melt blends of PLA polymerized from d-lactic acid or d-lactide and PLA polymerized from l-lactic acid or l-lactide can give a stereo-complex between the two stereo pure PLAs at a 50/50 ratio. Crystals of the stereo-complex itself have a much higher melt point than either of the two PLA ingredients. Similarly stereo-block PLA can be solid state polymerized from low molecular weight stereo-complex PLA.

Copolymers of lactic acid can be prepared by catalyzed copolymerization of lactic acid, lactide or another lactic acid derivative with one or more cyclic esters and/or dimeric cyclic esters as described above.

PHA may comprise up to about 99.8 weight %, of the composition, based on the total amount of PHA and nucleator used. For example, the PHA may be present in a range from a lower limit of about 96 to 100 weight %.

The PHA composition may comprise 0 to about 4%, about 0.1 to about 4%, about 0.5 to about 4%, about 1 to about 4%, about 1 to about 3%, about 0.5 to about 3%, or about 1 to about 2%, based on the weight of the composition, of a nucleator, which can include a carboxylic acid or its derivative that does not cause PHA depolymerization. The carboxylic acid or its derivative can include aromatic carboxylic acid (e.g., benzoic acid); aliphatic carboxylic acid (e.g., unsaturated fatty acid such as oleic acid; saturated fatty acid such as stearic acid and behenic acid; fatty acid alcohol such as stearyl alcohol; fatty acid ester such as butyl stearate; and fatty acid amide such as stearamide or ethylene bis-stearamide; behenamide); polycarboxylic acid; aliphatic hydroxy-carboxylic acid; or combinations of two or more thereof. Wishing not to be bound by theory, film or sheet made from a PHA composition comprising fatty acid derivatives or long chain (e.g., ≧31 carbons) may be less optically clear due to possible difficulty in dispersing these compounds or due to less solubility of these compounds in PHA such as above about 2% and due to a mismatch of refractive indices of the PHA and additives.

The carboxylic acids or their derivatives can be aliphatic, mono-functional (saturated, unsaturated, or multi-unsaturated) carboxylic acids thereof. The acid may have from about 10 to about 30, about 12 to about 28, about 16 to about 26, or 18 to 22, carbon atoms per molecule. Of particular interest are those on the US Food and Drug Administration (FDA) list as GRAS (generally regarded as safe) or having food contact status. The carboxylic acid derivatives may have a low volatility (do not volatilize at temperatures of melt blending with PHA) when being melt-blended with PHA or have particles that can well be dispersed in PHA such as those having diameters less than about 2µ or are non-migratory (do not bloom to the surface of PLA under normal storage conditions (ambient temperatures)). That is, a desired carboxylic acid has a boiling point higher than the melt processing temperature and pressure of PHA, which is disclosed elsewhere in the application.

Examples of nucleators include lauric acid, palmitic acid, stearic acid, behenic acid, erucic acid, oleic acid, linoleic acid, erucamide, behenamide, ethylene bis-stearamide, or combinations of two or more thereof.

The composition can also include, by weight of the composition, about 0.01 to about 25, about 0.1 to about 10, or about 0.2 to about 5%, of a toughening agent such as an ethylene copolymer, a core-shell polymer, or combinations thereof.

An ethylene copolymer may comprise repeat units derived from (a) ethylene; (b) one or more olefins of the formula $CH_2$=$C(R^3)CO_2R^4$, where $R^3$ is hydrogen or an alkyl group with 1 to 6 carbon atoms, such as methyl, and $R^4$ is glycidyl; and optionally (c) one or more olefins of the formula $CH_2$=$C(R^1)CO_2R^2$, or carbon monoxide where $R^1$ is hydrogen or an alkyl group with 1 to 8 carbon atoms and $R^2$ is an alkyl group with 1 to 8 carbon atoms, such as methyl, ethyl, or butyl. Repeat units derived from monomer (a) may comprise, based on the copolymer weight, from about 20, 40 or 50% to about 80, 90 or 95%. Repeat units derived from monomer (b) may comprise, based on the copolymer weight, from about 0.5, 2 or 3% to about 17, 20, or 25%. An example of the ethylene copolymer derived from ethylene and glycidyl methacrylate is referred to as EGMA. Optional monomers (c) can be butyl acrylates or CO. One or more of n-butyl acrylate, tert-butyl acrylate, iso-butyl acrylate, and sec-butyl acrylate may be used. An ethylene copolymer example is derived from ethylene, butyl acrylate, and glycidyl methacrylate (EBAGMA). Repeat units derived from monomer (c), when present, may comprise, based on the copolymer weight, from about 3, 15 or 20% to about 35, 40 or 70%. Alternatively the ethylene copolymer may be a glycidyl methacrylate grafted ethylene copolymer or polyolefin.

If an ethylene copolymer is present in the composition, the nucleator can be in the form of an alkyl ester or an alkyamide where the alkyl group has 4 to about 30 or 10 to about 20 carbon atoms.

A core/shell polymer may not comprise a vinyl aromatic comonomer, and have a refractive index not greater than 1.5; the core comprises one or more elastomers that may comprise polyalkyl acrylate and be optionally cross-linked; the shell comprises non-elastomeric polymer that may include polymethyl methacrylate and optionally contain functional groups including epoxy, carboxylic acid, or amine.

A core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

A PHA composition can comprise one or more additives including plasticizers, stabilizers, antioxidants, ultraviolet ray absorbers, hydrolytic stabilizers, anti-static agents, dyes or pigments, fillers, fire-retardants, lubricants, reinforcing agents such as flakes, processing aids, antiblock agents, release agents, and/or combinations of two or more thereof.

These additives may be present in the compositions, by weight, from 0.001 to 25%, or 0.01 to 2%. For example, the compositions may contain from about 0.5 to about 5% plasticizer; from about 0.1 to about 2% antioxidants and stabilizers; from about 3 to about 10% other solid additives; from about 0.5 to about 20% nanocomposite; and/or from about 1 to about 20 weight % flame retardants. Examples of suitable other solid additives include pigments such as titanium oxide, microwave susceptors such as carbon or graphite, induction heated metals such as steel powder or transition metal oxide, and radio frequency heat-sealing susceptors.

A thermoforming process comprises contacting a PHA composition or PHA with a nucleator to produce a compound. The contacting can include mixing PHA and nucleator till the nucleator is substantially or even homogeneously dispersed. Any impact modifiers (e.g. ethylene-acrylate copolymers, ionomers, grafting agents) and additives may be also dispersed in the composition. Any mixing methods known in the art may be used. For example, the component materials may be mixed to substantially dispersed or homogeneous using a melt-mixer such as a single or twin-screw extruder, blender, Buss Kneader, double helix Atlantic mixer, Banbury mixer, roll mixer, etc., to give a resin composition.

The contacting can include a melt-mixing temperature in the range above the softening point of the PHA and below the depolymerization temperature of the PHA of about 100° C. to about 400° C., about 170° C. to about 270° C., or about 180° C. to about 230° C. at an ambient pressure or in the range of 0 to about 60 MPa or 0 to about 34 MPa. The condition creates sufficiently high shear history to disperse the nucleator into small particles and distribute them uniformly through the melted PHA and sufficiently low shear history to avoid excessive loss of PHA molecular weight and its embrittlement. Shear history is the concept of the amount to shear over a duration of time. A melt experiences more shear history when it experiences high shear for a long time than when it experiences high shear for a short time. Similarly a melt experiences more shear history when it experiences medium shear for a time than when it experiences very low shear for a short time than when it experiences very low shear for a long time. The shear history of plastics processing equipment may be complicated by differing shear rates and duration times within the equipment for example in a single screw extruder producing pellets the screw has low shear rates and long durations within the channels of the screw but high screws rates and low durations between the top of the screw flight and the walls of the extruder. In general insufficiently high shear history is achieved by use of less than about 2 minutes of mixing from introduction of the ambient temperature ingredients into a heated, batch, twin blade mixer using rotor blade mixers that may be co- or counter-rotating or the use of a 10:1 length to diameter ratio trilobal, co-rotating twin screw extruder using a screw that contains less than 10% total length of screw elements that are either kneading blocks or reverse elements, the rest being forward conveying sections. For example, a sufficiently high shear history can result from use of at least 3 minutes on the batch unit and at least 20:1 L:D (length to diameter) ratio on the continuous unit and an excessively high shear history may result from more than 15 minutes in the batch unit or a 50:1 L:D ratio in the continuous unit. Other processing equipment can be used for melt mixing such as a single screw extruder, counter rotating twin screw extruder, or roll mill. Also useful processors may include bilobal twin screw extruders and single screw extruders with mixing torpedoes at the end of the screw. The carboxylic acid or derivative may be present in a sufficiently high or greater than 0.1% crystallization-improving amount thereby providing heat resistance at 55° C. or above. Not to be bound by theory, if the carboxylic acid or derivative is present at too high a level, it may cause the melt blend viscosity and melt strength to be too low or unstable for subsequence processing into pellets, sheeting, or thermoformed articles. For example, pellets of a concentrate of stearic acid in PLA may be formed via under-water pelletization if the nucleator additive level is less than about 20%. Above 20% the viscosity is speculated to be unstable for pelletization.

Furthermore the size of nucleator particles having unmatched refractive indexes with the PHA may be less than about 500 nm, less than about 300 nm, or even less than 80 nm for low haze. The difficulty of dispersing nucleator to small sizes may increase with amount of nucleator used and its solubility in the PHA. In general more than about 2% nucleator in the PHA may lead to hazy blends. For example, more than 3% or more than about 5% may give too high a level of haze irrespective of the type of mixing used.

Alternatively, a portion of the component materials can be mixed in a melt-mixer, and the rest of the component materials subsequently added and further melt-mixed until substantially dispersed or homogeneous. The resulting composition is a concentrate or master batch of carboxylic acid or derivative in PHA and can comprise, by weight of the composition, 2 to 80, 5 to 50%, or 10 to 25% of the carboxylic acid or derivative.

The composition may be molded into articles using any melt-processing technique suitable for PHA provided the processing into the finished article is done in a manner to achieve low haze with high crystallinity. Commonly used melt-molding methods known in the art to achieve low haze and crystallinity can include injection molding into a cold mold followed by blow molding, profile extrusion molding with stretching, or extrusion blow molding and followed by heat treatment. The compositions also may be melt-formed into films by extrusion or calendaring to prepare nearly amorphous cast film. Those cast films that are nearly amorphous may be further thermoformed into articles and structures followed by heat treatment. The articles can be recovered by any means known to one skilled in the art.

The compositions may also be used to form films, rods, profiles, sheets, fibers and filaments that may be unoriented and crystalline and having haze, or unoriented and amorphous semi finished articles, or oriented from the melt such as blown film or at a later stage oriented by heating a nearly amorphous semi finished article such as by injection stretch blow molding, biaxial or uniaxial orientation, or thermoforming.

The composition may be formed into films or sheets by extrusion through either slot dies and rapidly cooled by contact with metal rolls held at or below Tg to produce a first article including film or sheet or blown film or sheet. The first article can have a surface area to thickness ratio greater than about 100,000:1 inch (254,000:1 cm) or > about 1000:1 inch (2540:1 cm) inch. The article can also have more than about 2%, 5%, or even 15% crystallinity (for example, PLA DSC method quantifies "30% crystallinity" as about 30 J/g melting endotherm minus exotherm for PLA when being heated from amorphous state at a rate of 10° C./minute).

The first article can be thermoformed in a mold at a temperature of at least about 90° C., at least about 95° C., at least about 100° C. or at least about 120° C. and may be up to about 140° C., to produce a second article. The second article is held in the heat mold for less than about 40, less than about 20 seconds, less than about 10 seconds, or less than about 5 seconds to produce a thermoformed article.

The mold shape can be any mold known to one skilled in the art such as trays, cup, cap, bowl, or lid. The mold material can be aluminum or ceramic and can be used for stretching (orientation) by application of vacuum from inside the mold to a heated sheet of PHA covering the top of the mold.

The thermoformed article can be transferred to another mold that is cool and hardens the article for resistance to deformation during subsequent handling, trimming, and stacking operations. For thick profiles, the cooling rate of the interior of the profile may be benefited by use of the coldest temperature practical on the exterior of the article. That temperature is desirably below the glass transition temperature of the PHA. For example, for PHA having a glass transition temperature of about 55° C. and sheeting thickness of about 700μ may benefit from using one-side quenching temperatures of 20° C. whereas 500μ sheet can be made amorphous using 30° C. one-sided quench conditions. Quench temperatures above about 55° C. may not be as useful because the desired hardness is a result of cooling the article below Tg (55° C. in this case). The exact minimum temperature may decrease when a PHA is used that is inherently slower at crystallizing or when a lower amount of nucleator is used.

In processing the near amorphous semi-finished article into a low haze and crystallized sheet, the amorphous article may be first heated by conductive, convective, or radiative heating. With radiative heating, the article is exposed to black-body radiation temperatures ranging from 200° C. to about 700° C. Time in a 230° C. black body radiator may range from about 10 seconds to about 70 seconds, or from 20 seconds to 60 seconds, or 30 seconds to 50 seconds for a 600μ thick profiles heated from both sides. The optimal temperature for the semi-finished article for achieving crystallinity and clarity in the next step is about half way between the glass transition and the melt point for the particular PHA used. Low temperatures cause the sheet not to fill the mold. Higher temperatures cause sheet collapse before forming into the mold can occur.

In forming the heated amorphous semi finished article into a finished low haze, crystalline article the semi-finished article may be stretched at sufficiently high speeds and high stretch ratios to cause crystallization and to enable those crystallites to be small enough to not cause high haze. X-ray is used to measure size of the crystallites. For low haze the crystallites size of PLA or PHA desirably is less than about 1000 nm or preferably less than about 100 nm or more preferably less than about 50 nm. Stretch rate may be about 10% to about 1000% per second, or between 20% per second and 500% per second. Stretch ratios may be about 20% (post stretch length is 150% of the pre-stretched dimension) to about 800%, or 50% to 700%, or 100% to 300%. Not wishing to be bound by theory, slow stretch rates may give haze or incompletely formed articles and too high stretch rates may give insufficiently high crystallinity resulting in finished articles which have poor dimensional stability above the glass transition temperature. Low stretch ratios may not induce enough crystallinity within the short time of the thermoforming process or cause haze in the finished article and too high a stretch ratio may cause excessive thinning or tearing of the article. The exact stretch ratio may be higher for unbalanced or one-dimensional stretching or articles which are not cooled during the stretching operation such as is the case for vacuum, pressure-assisted, or no physical "plug assistance". Otherwise those parts of the article that are cooled during the stretch operation may experience haze or poor dimensional stability.

The film may be a single layer of the PHA composition (a monolayer sheet) or a multilayer film or sheet comprising a layer of the PHA composition and at least one additional layer comprising a different material such as a Surlyn® ionomer resin heat seal layer.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer can range from about 10 to about 200 μm.

The outermost structural or abuse layer may be prepared from the PHA composition. Additional structure layers may include amorphous polyester or propylene/ethylene copolymer, but can also include amorphous polyamide (nylon). The structure layer can be printed, for example, by reverse printing using rotogravure methods.

Additional layers may be applied by lamination. The inner layer can include one or more barrier layers to reduce the permeation rate through the layer by agents such as water, oxygen, carbon dioxide, electromagnetic radiation such as ultraviolet radiation, and methanol that potentially can affect the product inside therein. Barrier layers can comprise, for example, metalized polypropylene or polyethylene terephthalate, ethylene vinyl alcohol, polyvinyl alcohol, polyvinylidene chloride, aluminum foil located so as not to interfere with the optical value of the PHA such as to read-through to the print layer, silicon oxides (SiOx), aluminum oxide, aromatic nylon, blends or composites of the same as well as related copolymers thereof.

The innermost layer of the package can be the sealant and can be a polymer layer or coating that can be bonded to itself (sealed) or other film or substrate at temperatures substantially below the melting temperature of the outermost layer. Sealants are well known and can be commercially available from E. I. du Pont de Nemours and Company (DuPont), Wilmington, Del. Substrate can include foil, paper or nonwoven fibrous material.

A multilayer film can be produced by any method well known to one skilled in the art such as, for example, solvent or thermal lamination or plasma deposition. Other suitable converting techniques are, for example, extrusion coating.

Films can be used to prepare packaging materials such as containers, pouches and lidding, balloons, labels, tamper-evident bands, or engineering articles such as filaments, tapes and straps.

The disclosure uses film as example and is applicable to sheet, which is thicker than film such as about 20 mil.

The article can be in other forms such as shaped articles or molded articles. Containers and packaging materials can be of various shapes including trays, cups, caps, bowls, or lids prepared from sheets by vacuum or pressure forming. Other shapes include those prepared by deep drawing an unstretched sheet (i.e. thermoforming), by extrusion blow molding or biaxial stretching blowing parisons (injection stretch blow molding), by injection molding, compression molding or other molding processes; profile extruded articles; carton; squeezable tubes, pouches or bottles; components of containers; bags or pouches within a rigid container that dispense liquids such as wine, medical fluids, baby formula; clam shells, and blister packs.

The thermoformed article can be recovered by any methods known to one skilled in the art.

A film or sheet could be thermoformed to produce a concave surface such as a tray, cup, can, bucket, tub, box or bowl. Thermoformed articles may be combined with additional elements, such as a generally planar film sealed to the thermoformed article that serves as a lid (a lidding film).

Products that can be packaged include food and non-food items including beverages (e.g., carbonated beverages, orange juice, apple juice, grape juice, other fruit juices and milk), solid foods (e.g., meats, cheese, fish, poultry, nuts, coffee, applesauce or other sauces, stews, dried fruit, food paste, soups and soup concentrates and other edible items), spices, condiments (e.g., ketchup, mustard, and mayonnaise), pet food, cosmetics, personal care products (e.g., toothpaste, shaving foam, soaps, shampoos, lotions and the like), pharmaceuticals, fragrances, electronic components, industrial chemicals or household chemicals (e.g., laundry detergent, fabric softener), agrochemicals, medical devices and equipment, medicinal liquids, fuels, and biological substances.

Films may also be slit into narrow tapes and drawn further to provide slit film fibers for use as degradable sutures.

The following Examples are illustrative, and are not to be construed as limiting the scope of the invention.

EXAMPLES

The examples illustrate the invention making thermoformed articles. In the tables, no data entry means not measured.

Example 1

Materials

PLA2002D pellets were purchased from NatureWorks LLC (Minnetonka, Minn. USA) and had a melt viscosity about 1500 Pa·s (190° C. and 100 s$^{-1}$), a Tg of 55° C., a melt point maximum endotherm at 150° C., no cool-down crystallization exotherm, and heat-up crystallinity generated with a second 10° C./minute heating of pellets previously heated to complete melting at 250° C. and cooled to 20° C. of about 0.5 J/g.

PLA4032D pellets were also purchased from NatureWorks LLC and had a Tg of 58° C., a melt point maximum endotherm at 166° C., and crystallinity of about 6 J/g making it a faster crystallizing PLA than PLA2002D.

Ethylene bisstearamide (EBS) was acquired from Aldrich.

Stearic acid was obtained from Aldrich (Batch 11821LC) 95% pure.

Behenamide was Crodamide® BR available from Croda Inc., Edison, N.J.

Irgafos® 168 was obtained from Ciba Specialty Chemicals (Tarrytown, N.Y. USA). EBAGMA was an autoclave-produced ethylene/n-butyl acrylate/glycidyl methacrylate terpolymer (monomer ratio 66.75 wt % ethylene, 28 wt % n-butyl acrylate, 5.25 wt % glycidyl methacrylate, melt index 12 dg/minute, 190° C., 2.16 kg load, melting range 50° C. to 80° C.).

Analytical Equipment and Methods

Continuous melt blending and amorphous sheet extrusion were accomplished on a Werner&Pfleiderer (W&P process) 28 mm trilobal twin screw extruder with coat hanger die and water-cooled quench drum. The extruder used an 830 mm long screw. Pellets and additives entered about 70 mm from the top of the screw as a solid mixture at about 10 kg/hr to 20 kg/hr using a Foremost volumetric pellet feeder. The screw used forward conveying segments for most of its length and about 20% of its length used kneading blocks. The unit was run at 125 rpm with a melt temperature of 190° C. to 210° C. The melt passed through a coat hanger die (20 cm width and a 0.76 mm die gap). The melt curtain fell vertically about 5 cm to a quench drum cooled to 10° C. to 23° C. depending on the example. The drum rotation speed was set to minimum melt draw. Sheet thickness was controlled between about 250 micron and about 750 micron by varying the throughput rate of the polymer feed.

DSC was a TA Instruments (New Castle, Del.) Model Q1000 and operated on about 9 mg of sample with 10° C./minute heating from ambient to 250° C. (in the case of PLA melting at 150° C. to 180° C.). The first heat can generate a crystallization endotherm when the polymer crystallizes and at higher temperatures an exotherm is generated that is the polymer crystals melting. The "J/g" for the endotherm minus the "J/g" for the exotherm is an approximate measure of the amount of crystallinity in the original sample expressed in "J/g". 100% crystalline PLA was taken as being 100 j/g based on the literature (R. E. Drumright et al, Advanced Materials 2000 (12), #23,1841 and Z. Kulinski, et al, Polymer 46 (2005) 10290-10300).

Shrinkage was measured as a percentage change in machine direction (stretch direction) length when an unconstrained sample was exposed to a temperature disclosed below for, e.g., 30 seconds.

Oriented and unoriented content of the amorphous and crystalline regions of samples was measured by x-ray.

Crystallite size was determined using the above-x-ray apparatus and method. The actual size calculation uses the Scherrer formula.

Nearly amorphous samples of PLA were prepared by the W&P process described above of the thicknesses shown in Table 1. Samples were then heat treated. Samples of about 1 cm by 1 cm were contacted on both sides by the platens of a press at 110° C. and with a pressure of less than 20 psi for 2 to 40 seconds (time uncertainty was 1 second) to avoid stretching of the samples. The samples were immediately (faster than about 0.5 seconds) removed and cooled to ambient temperature by conductive cooling on 20° C. surfaces. The amount of crystallinity developed was determined by DSC (e.g. melting endotherm minus previous heat-up crystallization exotherm). In another method a DSC unit heated the samples at 30° C./minute to 110° C. and held them for either 0 minutes or 60 seconds, then cooled the sample to ambient temperature at 30° C./minute and reheated the samples at the same rate. The crystallinity was determined by the second heating cycle by subtracting the crystallization exotherm from the melting endotherm).

Table 1 shows that the crystallization of unoriented PLA resins even with a nucleator took more than 40 seconds to develop a 25 J/g or more of crystallinity. Synergy was seen with PLA containing both behenamide and EBAGMA.

TABLE 1

| Run | Composition | Thickness (mil) | Heating at 110° C. (sec) | Crystallization Temp (° C.) | Crystallinity after heating (J/g) |
| --- | --- | --- | --- | --- | --- |
| 156-17 | PLA2002D + 1% EBS | 21 | 0 | 110 | 2.6 |
| | | | 10 | | 2.2 |
| | | | 20 | | 2.9 |
| | | | 40 | | 6.2 |

TABLE 1-continued

| Run | Composition | Thickness (mil) | Heating at 110° C. (sec) | Crystallization Temp (° C.) | Crystallinity after heating (J/g) |
|---|---|---|---|---|---|
| 156-9 | PLA2002D + 2% behenamide + 0.6% IRGAFOS168 + 0.5% EBAGMA | 21 | 0 | 101 | 2.5 |
| | | | 2 | | 11 |
| | | | 5 | | 3 |
| | | | 20 | | 11 |
| | | | 40 | | 16 |
| 156-10 | PLA2002D + 2% behenamide + 2% EBAGMA + 0.6% IRGAFOS 168 | 21 | 0 | 93 | 10 |
| 156-19 | PLA2002D + 1% Ultratalc 609 + 2% EBAGMA + 0.6% IRGAFOS 168 | 21 | 0 | 104 | 4 |
| 28-1 | 100% PLA4032D, no additive | 31 | 0 | 116 | 0.1 |
| | | | 10 | | 1 |
| | | | 20 | | 1 |
| | | | 40 | | 0.4 |
| | | | 60 +/− 60 | | 5 |
| | | | 120 +/− 60 | | 16 |
| 28-2 | PLA4032D + 1% stearic acid | 30 | 0 | 112 | 2 |
| | | | 10 | | 0.1 |
| | | | 20 | | 1 |
| | | | 40 | | 0.1 |
| | | | 60 +/− 60 | | 12 |
| | | | 120 +/− 60 | | 36 |
| 28-4 | PLA4032D + 1% behenamide + 1% EBAGMA | 30 | 0 | 93 | 16 |
| | | | 10 | | 15 |
| | | | 20 | | 18 |
| | | | 40 | | 21 |
| | | | 60 +/− 60 | | |
| | | | 120 +/− 60 | | |

Example 2

Cast sheet was produced from a solid pellet blend of (1) PLA2002D, (2) 70 kg PLA2002D+1.4 kg of master batch (weight ratio 50/50 of behenamide/EBAGMA; final concentration of 2% each of behenamide and EBAGMA in PLA2002D), and (3) a solid pellet blend of 70 kg PLA2002+ 2.8 kg of master batch (50/50 by weight of behenamide/ EBAGMA; final concentration of 4% each of behenamide and EBAGMA in PLA2002D). The process conditions involved melting the pellets in a 4.5-inch single screw extruder using set-points of 190° C. to 205° C. at a rate of about 650 kg/hr. The melt was fed through a screen patch and gear pump to a 91-cm wide coat hanger die feeding horizontally into the nip of a three-roll finisher controlled to 19° C., 25° C., and 31° C. (top roll to bottom roll). A 510μ thick sheet was made as shown in Table 2.

The sheets were fed from an unwind roll, and thermoformed (the actual forming took about 1 second) to produce trays of about 6-inch×6 inch×1 inch. The wall thickness or base thickness of the trays was about 430μ. Thermoforming equipment and process were as follows.

Radiant heater: heat came only from above; heat intensity was controlled by potentiometers, not temperature. The actual sheet temperature was established by a specific dwell time in the oven and manual confirmation of sheet temperature by direct contact temperature sensor.

Hot mold: 100° C. or other temperatures; mold opened faces down and there were 6 positions in the mold; an open frame lifted the heated sheet up toward the mold without contacting those parts of the sheet to be formed.

Cold mold: ambient temperature or could be allowed to rise higher; timings were linked such that time in hot mold was always the same as time in cold mold.

65° C. and 65° C. water bath: to test shrinkage of the walls and base of trays following a 30-45 second direct exposure to the water. The data are shown in Table 2.

The table shows surprisingly that crystallinity is generated in a formed sheet within a second whereas from the unformed sheet the crystallization time duration is much longer. Further the table shows that low shrinkage is possible even though the amount of crystallinity is not at the full capacity (example 1.5-2). The development of additional crystallinity in the formed tray is higher than in the unformed sheet accompanying the tray.

TABLE 2

| Sample | Crystallinity of cast sheet (J/g) | Oven time (second) | Sheet temp leaving oven (° C.) | Hot mold temp (° C.) | Time in hot mold (sec) | % Shrinkage of the base of sheet[1] |
|---|---|---|---|---|---|---|
| 1[2] | 0 | >30 | | 100 | >10 | |
| 2 | 3 | 51 | | 100 | 12 | 0 |
| | | 60 | 110 | 100 | 20 | 0 |
| | | 36 | 93[3] | 100 | 12 | 0 |
| | | 15 | 124 | 100 | 5 | 0 |
| | | 90 | 120 | 100 | 30 | 0 |
| | | 69 | 103 | 100 | 23 | 0 |
| | | 30 | 109 | 100 | 10 | 3 |

TABLE 2-continued

| Sample | Crystallinity of cast sheet (J/g) | Oven time (second) | Sheet temp leaving oven (° C.) | Hot mold temp (° C.) | Time in hot mold (sec) | % Shrinkage of the base of sheet[1] |
|---|---|---|---|---|---|---|
| 3[4] | 10 | 45 | | 125 | 15 | 0 |
| | | 36 | 84 | 110 | 12 | 0 (4) |
| | | 30 | 90 | 110 | 10 | 0 (8) |
| | | 54 | 70[3] | 125 | 18 | 0 |
| | | 45 | 63[3] | 125 | 15 | 0 |
| | | 45 | 80 | 110 | 15 | 0 |
| | | 45 | 100 | 110 | 15 | 0 |
| | | 36 | 84 | 110 | 12 | 0 |

[1]The values in the parentheses, if shown, were % shrinkage at 95° C..
[2]Shrinkage could not be measured because the tray sample was deformed badly.
[3]These temperatures were estimated from the oven's potentiometer setting and the duration of time of the sheet in the oven. The other temperatures are actual measurements of the sheet.
[4]Tray sample was parted into 95° C. water bath.

In another experiment PLA2002D and PLA4032 were melt-blended with a master batch of 50/50 behenamide/EBAGMA using a 30 mm W&P twin screw extruder feeding a single quench drum. The melt was mixed at a rate of about 30 lb/hr at 190° C. and fed through an 8-inch wide coat hanger die. The quench drum was controlled to 20° C. with cooling water. The cast sheet was 16+/−1 mil thick. The sheets were thermoformed in a Labformer batch thermoformer. They were first heated from both horizontal sides in a black body radiant heater set at 230° C. using a dwell time of 30 seconds. That dwell time softened the sheets as indicated by their bowing downward under their own weight. The mold was an ambient temperature aluminum that was designed for a tray of 9 cm×13 cm×2.2 cm. Time for forming was about 1 second and time in the mold was 0.5 seconds. The forming conditions gave trays with base or wall thicknesses of about 11 mils. Tests of the trays shows even with nucleation, the use of a cold mold did not achieve 0% shrinkage. The results (Table 3) also show that the use of sheets having too high an amount of crystallinity (sample 22) resulted in a poorly thermoformed article (i.e., the sheet did not fully form into, and reproduce, the mold geometry). Wishing not to be bound by theory, these sheets were molded using a cold or room temperature mold. Therefore the amorphous-stretched molecules remained amorphous-stretched in the tray. When the tray was heated above Tg those molecules relaxed suddenly and caused shrinkage. Hence a hot mold was needed to eliminate the amorphous-stretched molecules. Also needed was additive to allow the article to crystallize or harden enough in the hot mold to be able to be removed from the hot mold without being deformed.

TABLE 3

| Sample[1] | Crystallinity of cast sheet (J/g) | Time in black body radiator (second) | Tray base endotherm at Tg (J/g) | Tray base crystallinity at Tg (J/g) | Shrinkage (%) of the base of sheet |
|---|---|---|---|---|---|
| 11 | 0 | 30 | 0.5 | 1 | 20 |
| 12 | 3 | 10 | 0 | 13 | 35 |
| 13 | 11 +/− 3 | 10 | 0 | 11 | 20 |
| 14 | 15 +/− 1 | 10 | 0.2 | 17 | 18 |
| 15 | 26 +/− 15 | 5 | 0.2 | 11 | poorly formed |
| 15 | | 10 | | | 31 (poorly formed) |

[1]The compositions were: 11, 100% PLA2002D; 12, PLA2002D with 2% of the master batch; 13, PLA2002D with 4% of the master batch; 14, PLA4032D with 2% of the master batch; and 15, PLA4032D with 4% of the master batch . . .

In another experiment the same sheets and thermoforming apparatus as above were used except the mold was heated to 100° C. The results (Table 4) show that without additive, the PLA sheet required an excessively long time to "harden" enough to be removed from the mold without being deformed by the forces of removal. The results also show the value of heated molds. The results further show that addition of additive allowed the use of heated molds to achieve 0% shrinkage. Table 4 shows that including additive in the PLA reduced the time of the article in the hot mold to less than about 40 seconds.

TABLE 4

| Sample[1] | Crystallinity of cast sheet (J/g) | Time in 100° C. mold (sec) | Tray base endotherm at Tg (J/g) | Tray base crystallinity at Tg (J/g) | Molded article | Shrinkage (%) of the base of sheet |
|---|---|---|---|---|---|---|
| 11 | 0 | <120 | | | deformed | |
| 12 | 3 | 60 | 0 | 14 | deformed | 0 |
| | | 1120 | 0 | 22 | no deformation | |
| 13 | 11 +/− 3 | 4 | 0 | 15 | deformed | 0 |
| 13 | | 10 | 0 | 32 | no deformation | 0) |
| 14 | 15 +/− 1 | 10 | 0 | 43 | no deformation | 0 |

Example 3

This example shows results using PLA4032 to make thermoformed cups. Samples were made for (21) 100% PLA4032D and (24) PLA4032D containing 1% behenamide and 1% EBAGMA.

Cast sheets were prepared by extrusion at 220° C. through an 1.5-inch single screw extruder running at 50 rpm. The melt flowed through a 6-inch wide coat hanger die having a 30-mil die gap into the nip of a three roll cooled finisher. The resulting sheet was about 23+/−2 mil thick. The sheet was processed into 5.9 cm diameter, 5.25 cm deep bowls by first being heated on one side by direct contact with a heated metal platen set at 127 to 132° C. Shrinkage of the bowl was established by cutting a section of its wall and exposing directly to 60° C. water for 320 seconds. The change in the length of the wall section gave the percentage shrinkage value. Other sections of the wall were exposed to 100° C. heated platens from both sides for various time intervals while constrained from shrinking longitudinally by mechanical stops. The shrinkage of these heated samples was measured. As shown in Table 5, the use of constrained heat treatment of longer duration lowers the percentage shrinkage at 60° C.

The above near-amorphous cast sheets were thermoformed on a Labformer as described above. The black body radiant heater was set at 190° C. Calibration of sheet temperature (direct contact temperature sensor) with time in the oven was established as: 20 seconds gave 67° C. sheet, 30 seconds gave 75° C., 40 seconds gave 87° C., and 50 seconds gave 100° C. The tray mold was heated to 110° C. Table 7 shows that sheet having no pre-crystallinity stuck to the mold and was too soft for removal without deformation. The results also show that sheet having 18 J/g or more of crystallinity did not form or fill into the mold. All molded articles showed 0% shrinkage when exposed to 60° C. distilled water for 30 seconds. Crystallinity of the molded trays was shown to have increased.

TABLE 5

| Sample | Time in Contact Heater (seconds) | Crystallinity of Formed Base (J/g) | Crystallinity of Formed Wall (J/g) | Shrinkage of Wall without Heat Treatment (%) | Shrinkage of Wall with 7 sec. Heat Treatment (%) | Shrinkage of Wall with 15 sec. Heat Treatment (%) | Shrinkage of Wall with 20 sec. Heat Treatment (%) |
|---|---|---|---|---|---|---|---|
| 21 | 2 | 3 +/− 3 | 7 +/− 2 | 10 | | | |
| 21 | 5 | 4 +/− 1 | 9 +/− 2 | 9 +/− 2 | 11 | 7 | 3 |
| 24 | 5 | 15 | 16 +/− 2 | 14 | 9 | 0 | |

| Sample | Crystallinity before heat treatment | Crystallinity after 15 second heat treatment | Crystallinity at Tg before heat treatment | Crystallinity at Tg after 15 second heat treatment |
|---|---|---|---|---|
| 21 | 6 | 5 | 0.5 | 0 |
| 21 | 6 | 5 | 0.5 | 0 |
| 24 | 12 | 15 | 0 | 0 |

Crystallinity unit was J/g

In another experiment, PLA blends were compounded and extruded into 18+/−2 mil cast sheet. The compounding was done on a 30 mm W&P twin screw extruder running at 150 rpm, using 190° C. set points. At a rate of 20 lb/hr the melt reached about 230° C. That melt was extruded through a coat hanger die to give an 8-inch wide curtain the fed a quench drum operated with 10° C. incoming cooling water which exited the drum at 16° C. DSC analysis of the cast sheeting showed the inherent crystallinity of the cast sheets that used behenamide to be 6 to 18 J/g depending on the amount of behenamide or master batch. The inherent crystallinity of unmodified PLA or stearic acid modified PLA were 0 J/g which meant they were 100% amorphous sheets. DSC analysis (Table 6) involving heating the sheet-sample to 250° C. and cooling and reheating at 10° C./minute showed the modified sheets developed crystallinity during the 120 second time duration the sample was being heated across the 20° C. window of crystallization during the second heat-up.

TABLE 6

| Sample | Composition | Crystallinity in cast sheet (J/g) | Crystallization Temp (° C.) | Cast sheet crystallization behavior (2nd heating heat-up crystallization exotherm) (J/g) |
|---|---|---|---|---|
| 33 | PLA2002D + 1% stearic acid | 0 | 118 | 0 |
| 34 | PLA2002D + 1.6% behenamide | 6 | 94 | 22 |
| 35 | PLA2002D + 2.9% master batch | 6 | 97 | 24 |
| 36 | PLA4032D | 0 | 134 | 17 |
| 37 | PLA4032D + 1% stearic acid | 0 | 130 | 38 |
| 38 | PLA4032D + 1% behenamide | 6 | 98 | 36 |
| 39 | PLA4032D + 2% master batch | 18 | 92 | 29 |

TABLE 7

| Sample | Time in black body radiant oven (sec) | Time in heated mold (second) | Crystallinity of the tray (J/g) | Notes |
|---|---|---|---|---|
| 33 | 30 | 30 | | stuck to mold, deformed on removal |
| 33 | 45 | 120 | | stuck to mold, deformed on removal |
| 34 | 30 | 30 | 27 | well formed |
| 34 | 30 | 5 | 23 | well formed |
| 35 | 30 | 30 | 27 | stuck to mold, deformed on removal |
| 36 | 45 | 60 | 27 | stuck to mold, deformed on removal |
| 36 | 45 | 120 | 40 | well formed |
| 37 | 15 | 60 | 20 | well formed |
| 38 | 27 | 15 | 47 | well formed |
| 38 | 20 | 2 | | well formed |
| 39 | 30 | 15 | 44 | did not form into mold |

Endotherm at Tg (J/g) for all runs was 0, except for runs 33 and 38 that were not measured.

Cast sheets were made by compounding on twin screw extruders onto a cooled quench drum. The crystallinity of the cast sheets was measured. Table 8 shows behenamide with EBAGMA generated a desirable amount of crystallinity (not too high) over a range of behenamide concentrations. BA stands for behenamide.

TABLE 8

| Sample | Composition | Crystallinity in cast sheet (J/g) | Extruder used | Polymer melt Temp (° C.) | Cooling water into/out-of quench drum [C/C] |
|---|---|---|---|---|---|
| 108-1 | PLA4032D | 0 | 30 mm | | 23/29 |
| 108-2 | PLA4032D + 1% stearic acid | 0 | 30 mm | | 23/29 |
| 108-3 | PLA4032D + 1% EBS | 17 | 30 mm | | 23/29 |
| 108-4 | PLA4032D + 1% BA + 1% EBAGMA | 5 | 30 mm | | 23/29 |
| 108-5 | PLA4032D + 0.2% BA + 0.2% EBAGMA | 4 | 30 mm | | 23/29 |
| 85-2 | PLA2002D + 1% stearic acid | 3 | 28 mm | 220 | |
| 85-4 | PLA2002D + 2% stearic acid | 2 | 28 mm | 220 | |
| 85-16 | PLA2002D + 1% ultra talc | 2 | 28 mm | 220 | |
| 85-17 | PLA2002D + 2% ultra talc | 2 | 28 mm | 220 | |
| 85-18 | PLA2002D + 3% ultra talc | 1 | 28 mm | 220 | |
| 104-0 | PLA2002D | 0 | 28 mm | 230 | 17/17 |
| 104-1 | PLA2002D + 2% EBAGMA | 0 | 28 mm | 230 | 17/17 |
| 104-2 | PLA2002D + 2% EBS + 2% EBAGMA | 4 | 28 mm | 230 | 17/17 |
| 104-3 | PLA2002D + 4% BA + 2% EBAGMA | 7 | 28 mm | 230 | 17/17 |
| 104-4 | PLA2002D + 3% BA + 2% EBAGMA | 9 | 28 mm | 230 | 17/17 |
| 104-5 | PLA2002D + 2% BA + 2% EBAGMA | 5 | 28 mm | 230 | 17/17 |
| 104-6 | PLA2002D + 2% BA + 2% EBAGMA | 10 | 28 mm | 230 | 17/17 |

The invention claimed is:

1. A process comprising extruding a poly(hydroxyalkanoic acid) composition to produce a first article; thermoforming the first article in a heated mold having a temperature ≧ about 90° C. to produce a second article; and heat treating the second article by holding the second article in a heated mold for less than about 40 seconds to produce a thermoformed article wherein the composition comprises or consists essentially of poly(hydroxyalkanoic acid) and 0 to about 4%, based on the weight of the composition, of a nucleator; and the first article is a film or sheet and is partially crystallized.

2. The process of claim 1 wherein
the first article is held in the heated mold having a temperature ≧ about 95° C.;
the thermoformed article has at least 10% crystallinity;
the composition comprises poly(hydroxyalkanoic acid), 0 to about 4% of the nucleator, and optionally an impact modifier;
the impact modifier is selected from the group consisting of an ethylene copolymer, a core-shell polymer, and combinations thereof;
the nucleator includes one or more carboxylic acids or, if the composition comprises the ethylene copolymer, an alkyl ester of the carboxylic acid, alkyl amide of the carboxylic acid, or combinations thereof; and the carboxylic acid includes aromatic carboxylic acid, aliphatic carboxylic acid, polycarboxylic acid, aliphatic hydroxycarboxylic acid, or combinations of two or more thereof; and
the ethylene copolymer comprises repeat units derived from (a) ethylene; (b) alkyl(meth)acrylate; and optionally (c) glycidyl(meth)acrylate or carbon monoxide.

3. The process of claim 2 wherein the first article is held in the heated mold having a temperature about 90° C. to about 140° C. and the nucleator is present in the composition from about 0.1 to about 4%.

4. The process of claim 3 wherein the poly(hydroxyalkanoic acid) comprises repeat units derived from hydroxyalkanoic acids having five or fewer carbon atoms and the nucleator is present in the composition from about 0.5 to about 4%.

5. The process of claim 4 wherein the poly(hydroxyalkanoic acid) comprises repeat units derived from glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, 5-hydroxyvaleric acid, or combinations of two or more thereof and the nucleator is present in the composition from about 1 to about 4%.

6. The process of claim 5 wherein
the composition comprises the impact modifier; the poly(hydroxyalkanoic acid) comprises poly(glycolic acid), poly(lactic acid), poly(hydroxy-butyric acid), poly(hydroxy-butyrate-valerate) copolymer, copolymer of glycolic acid and lactic acid, hydroxyvaleric acid, 5-hydroxyvaleric acid, or combinations of two or more thereof;
the nucleator includes aliphatic, mono-functional carboxylic acid; and
the nucleator is present in the composition from about 0.5 to about 3%.

7. The process of claim 6 wherein the impact modifier is the ethylene copolymer; the poly(hydroxyalkanoic acid) is the poly(lactic acid); the nucleator is an aliphatic, mono-functional carboxylic acid; and the nucleator is present in the composition from about 1 to about 2%.

8. The process of claim 7 wherein the ethylene copolymer comprises repeat units derived from ethylene, alkyl(meth)acrylate, and glycidyl(meth)acrylate; the nucleator includes stearic acid, behenic acid, behenamide, erucic acid, ethylene bis-stearamide, or combinations of two or more thereof; and the nucleator is present in the composition from about 1 to about 2%.

9. The process of claim 8 wherein the ethylene copolymer comprises copolymer of ethylene, butyl acrylate, and glycidyl methacrylate.

10. The process of claim 8 wherein the nucleator is stearic acid or behenamide.

11. The process of claim 9 wherein the nucleator is stearic acid or behenamide.

12. The process of claim 2 further comprising the impact modifier.

13. The process of claim 12 wherein the impact modifier is the ethylene copolymer comprising repeat units derived from ethylene, butyl acrylate, and glycidyl methacrylate.

14. The process of claim 2 wherein the composition is a concentrated master batch comprising about 25 to about 50% of stearic acid, behenamide, or both and about 50 to about 75% of poly(hydroxyalkanoic acid).

15. The process of claim 2 wherein the second article in the heated mold is held for less than about 30 seconds.

16. The process of claim 15 wherein the second article in the heated mold is held for less than about 20 seconds.

17. The process of claim 16 wherein the second article in the heated mold is held for less than about 15 seconds.

18. The process of claim 10 wherein the second article in the heated mold is held for less than about 15 seconds.

19. The process of claim 11 wherein the second article in the heated mold is held for less than about 15 seconds.

20. The process of claim 13 wherein the second article in the heated mold is held for less than about 15 seconds.

* * * * *